United States Patent [19]

Kraus

[11] Patent Number: 4,660,220

[45] Date of Patent: Apr. 21, 1987

[54] NO ANSWER MODE FOR TELEPHONE SYSTEMS

[76] Inventor: Constantine R. Kraus, 845 Mt. Moro Rd., Villanova, Pa. 19085

[21] Appl. No.: 833,880

[22] Filed: Feb. 25, 1986

[51] Int. Cl.⁴ ............................................: H04M 3/42
[52] U.S. Cl. .................................................. 379/210
[58] Field of Search ........ 179/18 AB, 18 BG, 18 BC, 179/84 C, 18 DH, 7.1 R, 18 B, 18 BE

[56] References Cited

U.S. PATENT DOCUMENTS

| | | | |
|---|---|---|---|
| 3,570,008 | 3/1971 | Downing et al. | |
| 3,728,486 | 4/1973 | Kraus | 179/2 R |
| 3,784,721 | 1/1974 | Kilby | 179/84 C |
| 3,989,901 | 11/1976 | Neuwirth et al. | 179/84 C |
| 4,219,700 | 8/1980 | Panizzon et al. | 179/18 AB |
| 4,291,199 | 9/1981 | Densmore et al. | 179/18 AB |
| 4,298,774 | 11/1981 | Jusinskas, Jr. | 179/18 BG |
| 4,481,383 | 11/1984 | Madon | 179/18 BC |

Primary Examiner—James L. Dwyer
Attorney, Agent, or Firm—Ratner & Prestia

[57] ABSTRACT

A method for signalling that a called telephone line in a telephone system will not be answered during an incoming call. Each called telephone line has a no answer mode. Incoming calls to a called telephone line in the no answer mode are coupled to a no answer trunk which transmits a distinctive no answer tone to the calling line. The no answer mode for a telephone line is activated by transmitting a no answer command code from the telephone line to a central control. All incoming calls through the central control are screened to determine whether the no answer mode of the called telephone line has been activated. A central control computer contains line information associated with each telephone line coupled to the central control. Each line information segment includes a field which indicates whether the associated telephone line is in the no answer mode.

9 Claims, 4 Drawing Figures

NO ANSWER MODE FOR TELEPHONE SYSTEMS

BACKGROUND OF THE INVENTION

A. Field of the Invention

This invention relates to telephone systems and in particular to a no answer mode for telephone lines.

B. Prior Art

The telephone is the major means of communication in business, industry, government and social intercourse. The telephone, however, is inefficient with respect to the time wasted on calls which are not answered. To complete the 280 billion calls made annually in the United States, 600 billion call attempts are required. Of the 180 billion failures, 90 billion are "busies" and the same number are "don't answers". Thus, only 7 out of 10 calls are completed on the first attempt.

In prior art systems, such as U.S. Pat. No. 3,570,008, when a called line was not answered, the calling party received a ringing tone corresponding to the ringing of the unanswered telephone. The time wasted on an average "don't answer" is 18 seconds.

It is known in the art to provide telephone answering machines. Answering machines, when activated, detected an incoming call and, after a predetermined number of rings, answered the call. These machines delivered a message determined and stored in the machine on magnetic tape by the called party. The calling party could then record a message for the called party on magnetic tape provided within the answering machine. The called party could, at a later time, retrieve this message from the magnetic tape.

SUMMARY OF THE INVENTION

A method is provided for signalling that a called telephone line in a telephone system will not be answered during an incoming call. The called telephone line is provided with a no answer mode. Incoming calls to a called telephone line in the no answer mode are coupled to a no answer trunk which transmits a distinctive no answer tone to the calling line. The no answer mode for a telephone line is activated by transmitting a no answer command code from the telephone line to a central control. All incoming calls through the central control are screened to determine whether the no answer mode of the called telephone line has been activated.

DETAILED DESCRIPTION OF THE INVENTION

Figure 1:
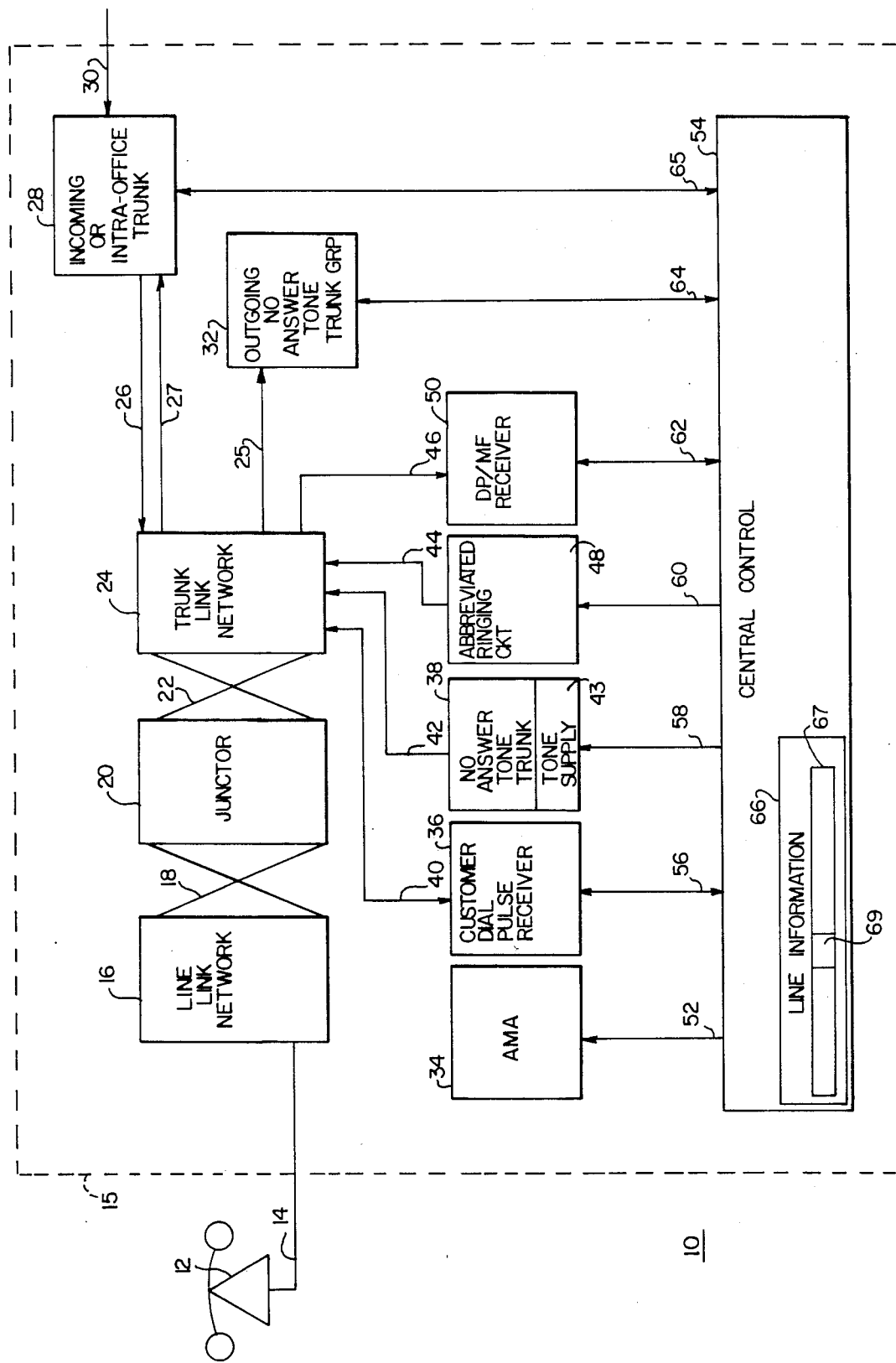
FIG. 1 is a block diagram of the no answer system of the present invention.

FIG. 1 shows no answer system 10. System 10 includes a telephone set 12 having a telephone line 14 which may be coupled to an external line 30 of an incoming trunk 28 through central office 15 including line link network 16, junctor 20 and trunk link network 24. Each of these devices which links telephone line 14 to external line 30 carrying an incoming call is controlled by central control 54. Central control 54 controls the routing and billing of all calls through system 10 and is a real time computer such as a #1 Electronic Switching System produced by Western Electric Co. Such switching systems are disclosed in U.S. Pat. No. 3,570,008 issued to Downing et al on Mar. 9, 1971 which is incorporated herein by reference.

Figure 2:
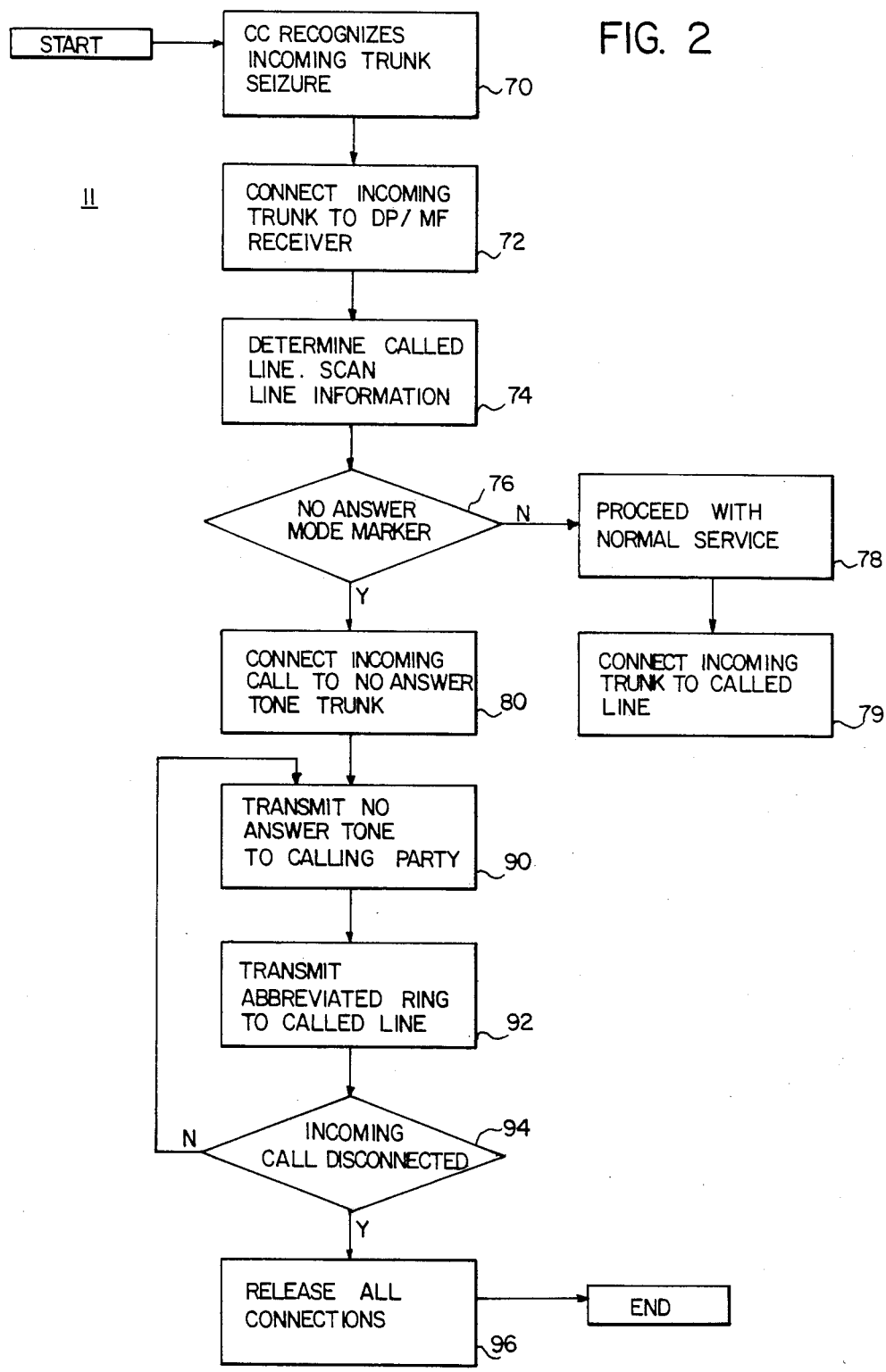
FIG. 2, is a flow chart of the operation of the no answer mod operation of the present invention.

Referring now to FIG. 2, a flow chart of process 11 for processing an incoming call on line 30 within no answer system 10 is shown. An incoming call on line 30 seizes incoming trunk 28. Trunk 28 is a conventional incoming trunk such as that shown in Western Electric Company Schematic Drawing 1A166. It will be understood by those skilled in the art that a plurality of incoming trunks 28 may be routed through trunk link network 24. However, only one incoming trunk line 30 is shown to simplify the drawing. In block 70 central control 54 recognizes the seizure of incoming trunk 28 by line 30 which indicates a call from a distant office. Using conventional trunk handling techniques, central control 54 controls trunk 28 by line 65 to cause the call on incoming line 30 to be routed through line 26 to trunk link network 24.

Central control 54 also controls trunk link network 24 although the control line has been left out of the drawing for clarity. It will be understood by one skilled in the art that there may be a plurality of trunk link networks 24 within system 10 and that the function of network 24 is to terminate trunks, such as incoming trunk 28 as previously described, and to terminate junctors, such as junctor 20.

Central control 54 routes the incoming call on line 26 through trunk link network 24 to Dial Pulse/Multi Frequency receiver (DPMF) 50 through line 46 as shown at block 72. DPMF 50 receives and stores the telephone number of the called telephone line. When DPMF 50 completely receives this information from the distant orifice, the information is transferred by line 62 to central control 54.

As shown in block 74, central control 54 determines which telephone line 14 is accessed by the incoming call using the called customer telephone line number transmitted from DPMF 50. While only one telephone line 14 is shown in FIG. 1, it will be understood by one skilled in the art that a plurality of telephone lines 14 may be coupled to system 10 under the control of central control 54.

Each telephone line 14 within system 10 has a corresponding portion or record 67 of information associated with it in line information 66 of central control 54. Line information 66 is an area of memory within central control 54 which is present in conventional central office systems. Within record 67 of line information associated with each telephone line 14 is field 69 which stores a marker indicating whether the no answer mode of the associated telephone line 14 is activated. Field 69 is not present in a conventional line information segment and therefore must be added to form line information 66 of the present invention.

The no answer mode of a telephone line 14 is a mode in which a distinctive no answer tone is transmitted to a calling line which accesses telephone line 14 when telephone line 14 is in the no answer mode. The transmitted no answer tone signals the calling line that called telephone line 14 will not be answered.

Thus, when central control 54 checks field 69 of a record 63 within line information 66 associated with a telephone line 14, a determination is made whether no answer field 69 has a marker in it as shown in decision 76. If there is no marker in no answer field 69, central control 54 proceeds with normal telephone service as shown in block 78. Normal service includes connecting incoming trunk 28 to the called telephone line 14 as shown in block 79.

However, if field 69 has a marker indicating that a called telephone line 14 is in the no answer mode, central control 54 couples the incoming call to no answer tone trunk 38 through trunk link network 24 as indicated in block 80. Central control 54 also controls no answer tone trunk 38 using line 58. No answer tone trunk 38 is formed from a conventional service trunk such as that shown in Western Electric Company Schematic Drawing 1A218 which may already be present in a conventional office system. The conventional trunk is modified by providing tone supply 43 to form no answer tone trunk 38.

In response to a signal on line 58, no answer tone trunk 38 applies a distinctive no answer tone to trunk link network 24 by line 42. The distinctive tone applied to trunk link network 24 is the tone produced by tone supply 43. Trunk link network 24, which links trunks 38,28, applies the no answer tone to incoming trunk 28 by line 27 as described in block 90. Trunk 28 thus applies the no answer tone to incoming line 30 thereby signalling the calling party on incoming trunk 28 that the call will not be answered.

The no answer tone is a distinctive tone which a calling party placing an incoming call to telephone line 14 recognizes as being distinct from the conventional busy signal and distinct from the conventional ringing signal.

Additionally, when a telephone line 14 whose no answer mode is activated is accessed, an abbreviated ring from abbreviated ring circuit 48 is transmitted to telephone 12 through trunk link network 24, juncture 20, line link network 16 and switches 18,22 as indicated in block 92. The abbreviated ring is recognized as distinct from a conventional ring and serves to remind a customer that the no answer mode is active and to signal the customer that an incoming call is receiving a no answer tone.

Abbreviated ring circuit 48 may be formed by adapting a conventional service trunk such as that shown in Western Electric Company Schematic Drawing 1A168. This conventional service trunk produces the conventional ring which a called party receives when accessed by a calling party. Conventional timing circuits within the service trunk are modified to produce a ring of shorter duration to form abbreviated ringing circuit 48.

In decision 94 a determination is made whether the incoming call has been disconnected. Normally, when the calling party hears the no answer tone, the calling party hangs up thereby disconnecting the incoming call. The no answer tone from no answer tone trunk 38 is therefore coupled through trunk link network 24 to incoming line 30 until the incoming call is disconnected. Thus, as long as the calling party keeps the call connected, blocks 90,92 are executed causing a continuation of the abbreviated ring at telephone 12 and a continuation of the no answer tone at incoming line 30. When the incoming call is terminated, as determined by decision 94, all connections are released as shown in block 96.

Figure 3:
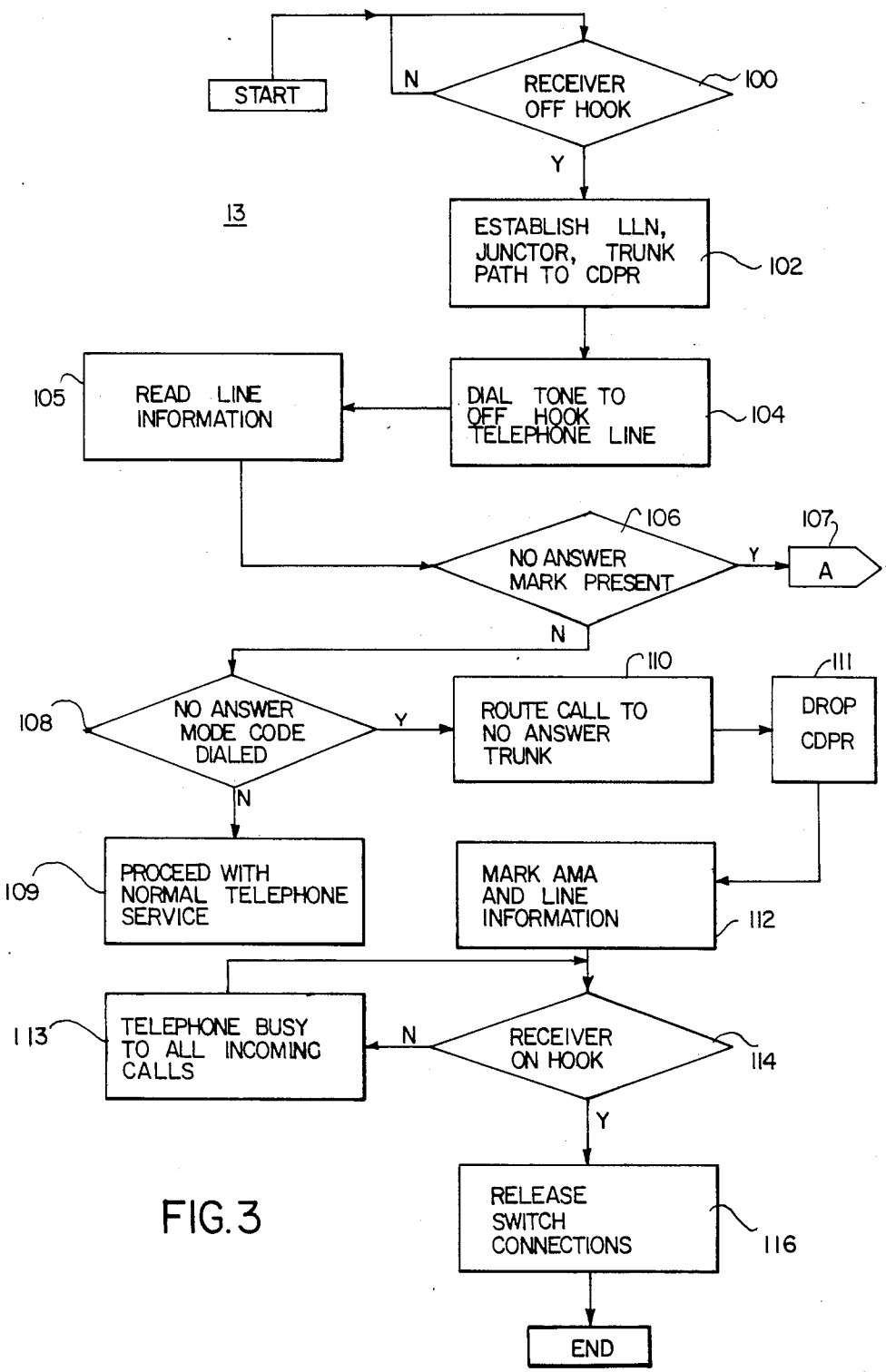
FIG. 3 is a flow chart of the activation of the no answer mode of FIG. 2.

Referring now to FIG. 3 there is shown a flow chart representation of process 13 for activating the no answer mode of no answer telephone system 10. It will be understood by one skilled in the art that system 10 includes a plurality of telephone lines 14 each line 14 being coupled to at least one telephone 12. In decision 100, central control 54 determines whether the receiver of a telephone 12 has been lifted by recognizing an off hook signal from line link network 16 in a conventional manner. If no receiver in system 10 is lifted, as determined at decision 100, central control 54 continues scanning all telephone lines 14 in system 10.

If a receiver is lifted as determined at decision 100, central control 54, as indicated in block 102, establishes connections between line link network 16 and junctor 20 through switches 18. Junctor 20 allows any telephone line 14 on any line link within line link network 20 to be connected to any trunk withinin trunk link network 24. Trunk link network 24 is coupled to junctor 20 through switches 22.

Trunk link network 24 allows connection to any trunk circuit. A connection from trunk link network 24 is established by way of line 40 to customer dial pulse receiver 36 thus creating a path from telephone 12 to customer dial pulse receiver 36. Customer dial pulse receiver 36 serves as a buffer to receive all of the pulses generated by telephone 12 and transmit them in a packet to central control 54 by way of line 56. As shown in block 104, a dial tone is also provided to telephone line 14 when an off hook condition is recognized. This dial tone is provided by customer dial pulse receiver 36 through trunk link network 24.

When all of the dial pulses produced by telephone line 14 are received by dial pulse receiver 36, including a no answer command code if present, the pulses are transmitted to central control 54 by way of line 56. Central control 54 checks the portion of line information 66 associated with off hook telephone line 14 as indicated in block 105. Central control 54 determines whether the no answer mode of telephone line 14 whose receiver has been lifted off hook is in the no answer mode by checking for a marker in field 69 as previously described. If telephone line 14 is already in the no answer mode as determined at decision 106, execution by central control 54 proceeds through off page connector 107 to the deactivation procedure of FIG. 4.

If telephone line 14 is not in the no answer mode as determined at decision 106, central control 54 determines whether a no answer command code has been dialed by the customer who went off hook in decision 108. If a no answer command code has not been dialed, central control 54 proceeds with normal telephone service as shown at block 109. If a no answer command code has been entered, as determined at decision 108, central control 54 proceeds with activation of the no answer mode.

Thus to activate the no answer mode a customer goes off hook and dials a no answer command code. This code may be of the form NNX in which N is any integer between two and nine and X is any integer between zero and nine. Thus the no answer command code may be any integer between 220 and 999.

If a no answer command code has been dialed, central control 54 routes the call from trunk link network 24 through line 25 to outgoing no answer tone trunk group 32 as indicated in block 110 and drops customer dial pulse receiver 36 as indicated in block 111. Outgoing no answer tone trunk 32 is formed from a conventional outgoing trunk such as that shown in Western Electric Company Schematic Drawing 1A165.

Central control 54 then marks Automatic Message Accounting (AMA) 34 for billing purposes and marks line information 66 by entering a marker in field 69. AMA 34 is an automatic message accounting system. Conventionally, the output of AMA 34 is a magnetic tape on which all billing information is written. This information may include the calling telephone number, the called telephone number, the time the call was initiated, the time the call was answered and the time the call was disconnected. This magnetic tape is then given to an accounting center.

Alternately, all of this information may be placed into a buffer and periodically the accounting center may interrogate central office 15 and receive this information directly. In system 10 the information compiled by AMA 34 includes a record of no answer mode usage. The purpose of outgoing no answer tone trunk group 32 is to make this information available to central control 54 for recording within AMA 34.

The activation of the no answer mode also requires the marking of line information 66. As previously described, there is a record 67 in line information 66 associated with each telephone line 14. Within the record 67 corresponding to each telephone line 14 is field 69 which indicates whether the corresponding telephone line 14 is in the no answer mode. At block 112, central control 54 inserts a marker into field 69 of the telephone line 14 which transmitted the no answer command code received from customer dial pulse receiver 36. Thus during no answer mode operation when central control 54 makes a determination whether a called telephone line 14 is in the no answer mode as previously described for decision 76, this marker is found in field 69.

After AMA 34 and line information 66 have been marked, a determination is made at decision 114 whether the receiver of telephone 12 is replaced. If not, incoming calls for telephone line 14 receive a busy signal as indicated in block 113. If the receiver of telephone 12 is replaced as determined at decision 114, all switch connections are released as shown in block 116 and the activation of the no answer tone is complete.

Figure 4:
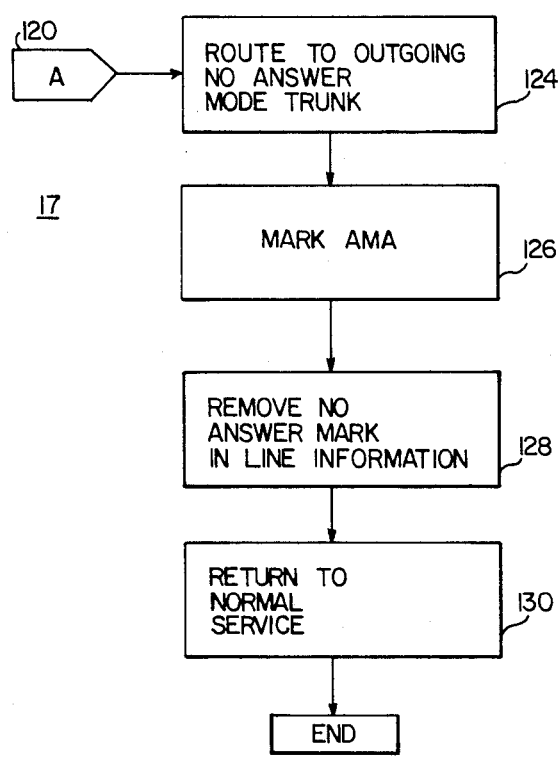
FIG. 4 is a flow chart of the de-activation of the no answer mode of FIG. 2.

Referring now to FIG. 4, there is shown a flow chart of process 17 for deactivating the no answer mode of telephone line 14. Execution proceeds from off page connector 107 of process 13 to on page connector 120 when central control 54 receives a signal from line link network 16 that the receiver of a telephone 12 has gone off hook and central control 54 has determined that a no answer marker is present within field 69 of the record 67 of information associated with the telephone line 14 which is off hook.

Off hook telephone line 14 is coupled to trunk link network 24 through line link network 16 and junctor 20 as previously described. Central control 54 routes the connection from trunk link network 24 through line 25 to outgoing no answer tone trunk group 32 as indicated in block 124. This allows central control 54 to make an entry indicating the time of deactivation in AMA 34 for billing purposes as indicated in block 126. This permits the telephone company to determine how long the customer used the no answer mode for the purpose of giving the customer a discount to provide an incentive for using the no answer mode. The discount may depend on such factors as the amount of time the no answer mode is activated or the number of times it is activated.

Central control 54 then removes the no answer marker from field 69 of record 67 associated with off hook telephone line 14 as indicated in block 128. The marker removed by central control 54 in block 128 is the marker placed within field 69 of line information 66 in block 112. Telephone line 14 is then returned to normal service as indicated in block 130. This includes providing the customer with a dial tone and allowing the customer to either hang up or place a call. Thus a customer may deactivate the no answer mode by simply going off hook. The customer cannot answer an incoming call when telephone line 14 is in the no answer mode as indicated by the abbreviated ring because going off hook results in deactivating the no answer mode and providing a dial tone to the customer.

In no answer system 10 the following components have been used for the operation and function as described and shown.

| Reference No. | Component |
|---|---|
| 28 | 1A166, Western Electric |
| 32 | 1A165, Western Electric |
| 38 | 1A218, Western Electric |
| 48 | 1A168, Western Electric |
| 54 | #1ESS, Western Electric |

What is claimed is:

1. A method for signalling that a called telephone line in a telephone system will not be answered during an incoming telephone call from a calling line, the telephone system having a plurality of telephone lines coupled to telephone customer telephone sets and at least one central office within the telephone system remote from the telephone customer telephone sets, comprising the steps of:

(a) providing a no answer mode for each of the telephone lines and activating the no answer mode for a telephone line in response to a no answer command code;

(b) first determining by the central office within the telephone system whether the no answer mode of the called telephone line is activated in response to the incoming call; and (c) transmitting by the central office within the telephone a no answer signal to the calling line for indicating that the called line will not be answered in response to the first determination.

2. The method of claim 1 in which step (a) further comprises the steps of:

providing central control means within the central office of the telephone system for routing calls within the telephone system and a line information having a portion associated with each telephone line;

transmitting a no answer command code from the telephone line to the central control means; and storing a no answer marker in the portion of the line information associated with the code transmitting telephone line.

3. The method of claim 2 in which step (b) includes the steps of:

locating the portion of the line information associated with the called telephone line; and second determining whether a no answer marker is stored in the located portion.

4. The method of claim 1 in which step (c) includes the steps of:

providing a no answer tone trunk within the central office of the telephone system; and coupling the calling line to the no answer tone trunk.

5. The method of claim 1 in which step (c) further comprises the step of transmitting a signal from the central office within the telephone system to the called telephone line to indicate that an incoming call is occurring while the no answer mode is activated.

6. The method of claim 3 further comprising the step of recording time information for billing.

7. The method of claim 2 further comprising the step of deactivating the no answer mode.

8. The method of claim 7 in which the step of deactivating the no answer mode comprises the step of removing the no answer marker in the portion of the line information associated with the deactivating telephone line.

9. A system for signalling that a called telephone line in a telephone system having a plurality of telephone lines coupled to telephone sets will not be answered during an incoming telephone call from a calling line, the telephone system having at least one telephone system central office remote from the telephone system,
- (a) means for providing a no answer mode for each of the telephone lines and activating the no answer mode for a telephone line in response to a no answer command code;
- (b) first means within the telephone system central office for determining whether the no answer mode of the called telephone line is activated in response to the incoming call; and
- (c) means for transmitting by the central office within the telephone system a no answer signal to the calling line in response to the first determination means.

* * * * *